US011823340B2

(12) United States Patent
Varekamp et al.

(10) Patent No.: US 11,823,340 B2
(45) Date of Patent: Nov. 21, 2023

(54) IMAGE SYNTHESIS SYSTEM AND METHOD THEREFOR

(71) Applicant: KONINKLIJKE PHILIPS N.V., Eindhoven (NL)

(72) Inventors: Christiaan Varekamp, Veldhoven (NL); Bartholomeus Wilhelmus Damianus Van Geest, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/771,900

(22) PCT Filed: Oct. 23, 2020

(86) PCT No.: PCT/EP2020/079864
§ 371 (c)(1),
(2) Date: Apr. 26, 2022

(87) PCT Pub. No.: WO2021/089340
PCT Pub. Date: May 14, 2021

(65) Prior Publication Data
US 2022/0383596 A1 Dec. 1, 2022

(30) Foreign Application Priority Data

Nov. 5, 2019 (EP) .................................... 19207149

(51) Int. Cl.
G06T 19/00 (2011.01)
G06T 7/70 (2017.01)
G06T 15/08 (2011.01)

(52) U.S. Cl.
CPC .............. G06T 19/006 (2013.01); G06T 7/70 (2017.01); G06T 15/08 (2013.01)

(58) Field of Classification Search
None
See application file for complete search history.

(56) References Cited

U.S. PATENT DOCUMENTS

2013/0176384 A1 7/2013 Jones et al.
2013/0307842 A1 11/2013 Grinberg et al.
(Continued)

FOREIGN PATENT DOCUMENTS

EP 3422708 A1 1/2019

OTHER PUBLICATIONS https://en.wikipedia.org/wiki/Computer-generated_imagery downloaded Apr. 13, 2022.
(Continued)

Primary Examiner — Robert J Craddock

(57) ABSTRACT

An image synthesis system comprises receivers (201, 203, 205) receiving scene data describing at least part of a scene; object data describing a 3D object from a viewing zone having a relative pose with respect to the object, and a view pose in the scene. A pose determiner circuit (207) determines an object pose for the object in the scene in response to the scene data and the view pose; and a view synthesis circuit (209) generates a view image of the object from the object data, the object pose, and the view pose. A circuit (211) determines a viewing region in the scene which corresponds to the viewing zone for the object being at the object pose. The pose determiner circuit (207) determines a distance measure for the view pose relative to the viewing region and changes the object pose if the distance measure meets a criterion including a requirement that a distance between the view pose and a pose of the viewing region exceeds a threshold.

20 Claims, 5 Drawing Sheets

(56) References Cited

U.S. PATENT DOCUMENTS

| | | |
|---|---|---|
| 2016/0025981 A1 | 1/2016 | Burns et al. |
| 2016/0260251 A1 | 9/2016 | Stafford et al. |
| 2017/0336863 A1 | 11/2017 | Tilton et al. |
| 2018/0176545 A1 | 6/2018 | Aflaki Beni |
| 2019/0110040 A1 | 4/2019 | Doyen et al. |

OTHER PUBLICATIONS https://en.wikipedia.org/wiki/Chroma_key downloaded Apr. 13, 2022.
https://en.wikipedia.org/wiki/Microsoft_HoloLens downloaded Apr. 13, 2022.
Britton Wolfe et al. "C2VE: A Software Platform for Evaluating the use of 3D Vision Technology for C2 Operations" Proceedings of the 17th International Command and Control Research and Technology Symposium, Jan. 1, 2012 p. 1-10.
International Search Report and Written Opinion from PCT/EP2020/079864 dated Nov. 13, 2020.

IMAGE SYNTHESIS SYSTEM AND METHOD THEREFOR

CROSS-REFERENCE TO PRIOR APPLICATIONS

This application is the U.S. National Phase application under 35 U.S.C. § 371 of International Application No. PCT/EP2020/079864, filed on Oct. 23, 2020, which claims the benefit of EP Patent Application No. EP 19207149.6, filed on Nov. 5, 2019. These applications are hereby incorporated by reference herein.

FIELD OF THE INVENTION

The invention relates to an image synthesis system and in particular, but not exclusively, to an image synthesis apparatus supporting view synthesis for a mixed, augmented or virtual reality application.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and look around in the scene being presented.

Such a feature can specifically allow a virtual reality experience to be provided to a user. This may allow the user to e.g. (relatively) freely move about in a virtual environment and dynamically change his position and where he is looking. Typically, such Virtual Reality (VR) applications are based on a three-dimensional model of the scene with the model being dynamically evaluated to provide the specific requested view. This approach is well known from e.g. game applications, such as in the category of first person shooters, for computers and consoles.

Another example is Augmented Reality (AR) or Mixed Reality (MR) applications where virtual generated content is mixed with the perception of the local environment. For example, a user may wear glasses or a headset that allows him to directly see his surroundings while also comprising displays that allows virtual content to be displayed such that it can be perceived by the user. The virtual content can be adapted to the real world views. For example, an MR system may allow a user to see the local environment with the appearance of an additional e.g. virtual object being present in the scene.

Similarly, in a VR experience, additional content, such as virtual objects, may be provided separately from the model describing the virtual scene and the VR system may such objects with the rendering of the scene such that the views provided to the user includes the object in the scene.

In AR and MR applications, a real background may thus be overlaid with computer graphics such as a 3D computer generated object. In a VR application, a virtual background may for example be overlaid with computer graphics such as a 3D computer generated object that is not part of the model of the scene.

The object may specifically be a 3D object which is aligned with the viewers' perspective and the representation of the 3D object in view images provided to the user may be adapted to the viewer's movements such that the object papers to the viewer to be present in the scene. For example, as the viewer moves, the appearance of the object is changed such that it is seen from different viewing directions.

However, in order to be able to generate such views of the object from different viewing directions, it is required that the object is represented by data sufficiently complete to preferably allow a view to be generated from any view position and orientation relative to the object. This may be feasible in some applications but in many applications, such as when the object is generated from a real world capture, the data representing the object may be limited.

For example, the object may be a real object that has been captured by a plurality of cameras arranged in a line with a given inter-camera distance. The number of cameras is typically relatively limited and in practice a camera rig with around 3-10 cameras is often used. However, a problem for such objects is that the capture of the object is typically quite limited and whereas accurate data may be available for e.g. viewing positions in front of the object, insufficient data is often be acquired for other viewing positions. For example, there may be no capture of any data for viewing positions behind or to the side of the object. This may render it impossible to synthesize views for some positions/orientations, or may at least result in a substantial degradation of image quality.

Specifically, a view synthesized object derived as a projection originating from a multi-view with depth (MVD) capture. Such an object can e.g. be segmented out from an original MVD capture making use of chroma-keying. However, for image objects that are synthesized from MVD content, high quality imaging is typically limited to positions in front of the object, and therefore it may be difficult or impossible to generate overlay content for all positions. Thus, degraded quality may be achieved for many viewer positions/poses, or the positions/poses that a viewer can take may be substantially limited in order to ensure sufficient quality.

Hence, an improved approach would be advantageous. In particular, an approach that allows improved operation, increased flexibility, an improved virtual/augmented/mixed reality experience, reduced complexity, facilitated implementation, increased synthesized image quality, improved rendering, increased (possibly virtual) movement freedom for a user, an improved user experience and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an image synthesis system comprising: a first receiver arranged to receive scene data describing at least part of a three dimensional scene; a second receiver arranged to receive object data describing a three dimensional object, the object data providing visual data for the three dimensional object from a viewing zone having a relative pose with respect to the three dimensional object; a third receiver arranged to receive a view pose for a viewer in the three dimensional scene; a pose determiner circuit arranged to determine an object pose for the three dimensional object in the three dimensional scene in response to the scene data and the view pose; a view synthesis circuit arranged to generate a view image from the visual data, the object pose, and the view pose, the view image comprising a view of the three dimensional object in the three dimensional scene with the three dimensional object being at the object pose and being viewed from the view pose; a circuit arranged to determine a viewing region in the three dimensional scene for the object pose of the three dimensional object and the relative pose of the viewing zone, the viewing region corresponding to the viewing zone in the three dimensional scene for the three dimensional object being at the object pose; wherein the pose determiner circuit is arranged to determine a distance measure for the view pose relative to the viewing region for the object pose, and to change the object pose in response to the distance measure meeting a first criterion that includes a requirement that a distance between the view pose and a pose of the viewing region exceeds a first threshold, and the view synthesis circuit is arranged to generate the view of the three dimensional object to be from different angles for at least some changes of the view pose for which the distance does not exceed the first threshold, and the pose determiner circuit is arranged to determine a new object pose following the change of the object pose, the determination of the new object pose being subject to a constraint that the distance measure does not meet the first criterion for the new object pose.

The invention may provide an improved user experience in many embodiments. It may allow improved trade-offs between image quality and freedom of movement for AR, VR and/or MR applications.

The approach may for example enable or facilitate an application where a synthesized virtual object may be merged with a scene such that the object will appear as a normal object in the scene with respect to small movements, but may adapt and change position and/or orientation if needed in order to maintain sufficiently high quality.

The approach may for example allow improved AR/VR/MR applications based on a limited capture and representation of an object to be synthesized, such as an object represented by multiple views and depth.

The viewing zone may be a set of view poses for which the object data is designated as sufficient for image synthesis. The poses of the viewing zone are determined relative to the 3D object. The view zone may be independent of the scene and may relate to a capture coordinate system or object coordinate system.

The viewing region may be a set of view poses comprising the view poses in the three dimensional scene which coincide with the viewing zone when the 3D object is added to the scene. The viewing region may be a region in the scene which coincides with the viewing zone when the object is positioned and oriented in accordance with the object pose. The viewing region may consist of the poses in the three dimensional scene which belong to the viewing zone when the object is positioned and oriented in accordance with the object pose.

The viewing zone may be a set of poses described/defined with respect to the object. The viewing region may be a set of poses described/defined with respect to the three dimensional scene. The viewing zone may be a set of poses described/defined with respect to an object or capture coordinate system. The viewing region may be a set of poses described/defined with respect to a scene coordinate system.

The scene data may be a full or partial description of the three dimensional scene. The scene data may comprise data describing a position and outline of one or more objects in the scene. The scene objects may be virtual objects or may be real-world objects for an MR/AR application.

A pose may be a position and/or orientation. The new object pose may be a pose to which the object pose is changed.

For a real-world three-dimensional scene (specifically for an AR/MR application), the scene data may e.g. be automatically generated using computer vision algorithms.

In accordance with an optional feature of the invention, the viewing region is at least a two dimensional region.

In accordance with an optional feature of the invention, the distance does not exceed the threshold for at least some view poses being in different directions from the object pose.

In some embodiments, the distance is dependent on a difference in orientation between the view pose and a pose of the viewing region. In some embodiments, the viewing region includes poses with different orientations relative to the object pose. In some embodiments, the viewing region comprises poses varying in at least two dimensions. In some embodiments, the viewing region is at least a three dimensional region. In some embodiments, the viewing region has an extension for at least one orientation dimension. In some embodiments, the viewing region has an extension for at least one orientation dimension and at least one position dimension. In some embodiments, the distance includes an orientation distance contribution. In some embodiments, the distance includes both a position distance contribution and an orientation distance contribution.

In accordance with an optional feature of the invention, the pose determiner circuit is arranged to not change the object pose for varying view poses when the distance measure meets a criterion including a requirement that the distance between the view pose and a pose of the viewing region does not exceed a second threshold.

This may provide an improved user experience in many embodiments, and/or may provide improved and/or facilitated operation. It may specifically allow a presentation such that the view of the 3D object changes with respect to movement of the viewer in the same way as a real object would.

In accordance with an optional feature of the invention, the change of object pose includes a change of a position of the object pose.

This may provide an improved user experience in many embodiments, and/or may provide improved and/or facilitated operation. The change in object pose may include a translational change.

In accordance with an optional feature of the invention, the change of object pose includes a change of an orientation of the object pose.

This may provide an improved user experience in many embodiments, and/or may provide improved and/or facilitated operation. The change in object pose may include a rotational change.

In accordance with an optional feature of the invention, the scene data includes data for at least one scene object in the three dimensional scene and the pose determiner circuit is arranged to determine a new object pose following the change subject to a constraint that there is no occlusion from the view pose of the three dimensional object by the at least one scene object.

This may provide an improved user experience in many embodiments, and/or may provide improved and/or facilitated operation.

In accordance with an optional feature of the invention, the scene data includes object data for at least one object in the three dimensional scene, and the pose determiner circuit is arranged to determine a new object pose following the change subject to a constraint that there is no overlap between the at least one object in the three dimensional scene and the three dimensional object for the new view pose.

This may provide an improved user experience in many embodiments, and/or may provide improved and/or facilitated operation.

In accordance with an optional feature of the invention, the viewing zone comprises a reference pose and the pose determiner circuit is arranged to bias a new object pose following the change towards an alignment of the reference pose with the view pose.

This may provide an improved user experience in many embodiments, and/or may provide improved and/or facilitated operation. The pose determiner circuit may be arranged to determine the new object pose by evaluating a preference measure for a plurality of poses and the bias may be such that the closer the reference pose is to the view pose, the higher the preference measure. The pose having the highest preference measure may be selected as the new object pose.

The bias may be such that the smaller the distance between the reference pose and the view pose for a given candidate pose, the higher the change of selection of the candidate pose as the new object pose.

The bias may such that the pose for which all constraints for the selection of the new object pose are met and for which a distance measure between the reference pose and the view pose is the lowest is selected as the new object pose.

In some embodiments, the pose determiner circuit may be arranged to change the object pose to align the reference pose with the view pose. In some embodiments, the pose determiner circuit is arranged to select a new object pose following the change such that the reference pose is the same as the view pose.

In accordance with an optional feature of the invention, the pose determiner circuit is arranged to determine a new object pose following the change subject to a constraint that the distance measure does not meet the first criterion for the new view pose.

This may provide an improved user experience in many embodiments, and/or may provide improved and/or facilitated operation.

In accordance with an optional feature of the invention, the pose determiner circuit is arranged to bias a new object pose following the change towards a minimum pose difference relative to an object pose prior to the change.

This may provide an improved user experience in many embodiments, and/or may provide improved and/or facilitated operation.

The pose determiner circuit may be arranged to determine the new object pose by evaluating a preference measure for a plurality of poses and the bias may be such that the closer the pose is to the pose prior to the change, the higher the preference measure for the pose. The pose having the highest preference measure may be selected as the new object pose.

The bias may be such that the smaller the distance between a given candidate pose and the previous object pose, the higher the change of selection of the candidate pose as the new object pose.

The bias may be such that the pose for which all constraints for the selection of the new object pose are met and for which a distance measure between the pose and the previous object pose is the lowest is selected as the new object pose.

In accordance with an optional feature of the invention, the scene data includes data for at least one scene object in the three dimensional scene and the pose determiner circuit is arranged to determine a new object pose following the change subject to a constraint that there is no occlusion from the view pose of the at least one scene object by the three dimensional object.

This may provide an improved user experience in many embodiments, and/or may provide improved and/or facilitated operation.

In accordance with an optional feature of the invention, the pose determiner circuit is arranged to perform a search over poses for a region of the scene to find a new object pose following the change for which a plurality of constraints are met.

This may provide an improved user experience in many embodiments, and/or may provide improved and/or facilitated operation.

In accordance with an optional feature of the invention, the representation of the three dimensional object comprises a multi-view image and depth representation of the three dimensional object.

In accordance with an optional feature of the invention, the scene data provides a visual model of at least part of the three dimensional scene and the view synthesis circuit is arranged to generate the view image in response to the visual model to be a view of the scene from the view pose blended with the view of the three dimensional object.

According to an aspect of the invention there is provided a method of image synthesis comprising: receiving scene data describing at least part of a three dimensional scene; receiving object data describing a three dimensional object, the object data providing visual data for the three dimensional object from a viewing zone having a relative pose with respect to the three dimensional object; receiving a view pose for a viewer in the three dimensional scene; determining an object pose for the three dimensional object in the three dimensional scene in response to the scene data and the view pose; generating a view image from the visual data, the object pose, and the view pose, the view image comprising a view of the three dimensional object in the three dimensional scene with the three dimensional object being at the object pose and being viewed from the view pose; determining a viewing region in the three dimensional scene for the object pose of the three dimensional object and the relative pose of the viewing zone, the viewing region corresponding to the viewing zone in the three dimensional scene for the three dimensional object being at the object pose; and further comprising: determining a distance measure for the view pose relative to the viewing region for the object pose, and changing the object pose in response to the distance measure meeting a first criterion that includes a requirement that a distance between the view pose and a pose of the viewing region exceeds a first threshold, wherein generating the view image includes generating the view of the three dimensional object to be from different angles for at least some changes of the view pose for which the distance does not exceed the first threshold, and changing the object poses comprises determining a new object pose following the change of the object pose, the determination of the new object pose being subject to a constraint that the distance measure does not meet the first criterion for the new object pose.

There may be provided an image synthesis system comprising: a first receiver for receiving scene data describing at least part of a three dimensional scene represented in a first coordinate system (a scene coordinate system); a second receiver for receiving object data describing a three dimensional object, the object data providing visual data for the three dimensional object from a viewing zone having a relative pose with respect to the three dimensional object; a third receiver for receiving a view pose for a viewer in the three dimensional scene, the view pose being relative to the first coordinate system; a pose determiner circuit for determining an object pose for the three dimensional object in the first coordinate system in response to the scene data and the view pose; a view synthesis circuit for generating a view image from the visual data, the object pose, and the view pose, the view image comprising a view of the three dimensional object at the object pose from the view pose; a circuit for determining a viewing region in the first coordinate system for the object pose of the three dimensional object and the relative pose of the viewing zone, the viewing region corresponding to the viewing zone in the first coordinate system for the three dimensional object being at the object pose; wherein the pose determiner circuit is arranged to determine a distance measure for the view pose relative to the viewing region for the object pose, and to change the object pose in response to the distance measure meeting a first criterion that includes a requirement that a distance between the view pose and a pose of the viewing region exceeds a first threshold.

There may be provided an image synthesis system comprising: a first receiver (201) for receiving scene data describing at least part of a three dimensional scene; a second receiver (203) for receiving object data describing a three dimensional object, the object data providing visual data for the three dimensional object from a viewing zone having a relative pose with respect to the three dimensional object; a third receiver (205) for receiving a view pose for a viewer in the three dimensional scene; a pose determiner circuit (207) for determining an object pose for the three dimensional object in the three dimensional scene in response to the scene data and the view pose; a view synthesis circuit (209) for generating a view image from the visual data, the object pose, and the view pose, the view image comprising a view of the three dimensional object in the three dimensional scene with the three dimensional object being at the object pose and being viewed from the view pose; a circuit (211) for determining a viewing region in the three dimensional scene for the object pose of the three dimensional object and the relative pose of the viewing zone, the viewing region corresponding to the viewing zone in the three dimensional scene for the three dimensional object being at the object pose; wherein the pose determiner circuit (207) is arranged to determine a distance measure for the view pose relative to the viewing region for the object pose, and to change the object pose in response to the distance measure meeting a first criterion that includes a requirement that a distance between the view pose and a pose of the viewing region exceeds a first threshold.

There may be provided a method of image synthesis comprising: receiving scene data describing at least part of a three dimensional scene; receiving object data describing a three dimensional object, the object data providing visual data for the three dimensional object from a viewing zone having a relative pose with respect to the three dimensional object; receiving a view pose for a viewer in the three dimensional scene; determining an object pose for the three dimensional object in the three dimensional scene in response to the scene data and the view pose; generating a view image from the visual data, the object pose, and the view pose, the view image comprising a view of the three dimensional object in the three dimensional scene with the three dimensional object being at the object pose and being viewed from the view pose; determining a viewing region in the three dimensional scene for the object pose of the three dimensional object and the relative pose of the viewing zone, the viewing region corresponding to the viewing zone in the three dimensional scene for the three dimensional object being at the object pose; and further comprising: determining a distance measure for the view pose relative to the viewing region for the object pose, and changing the object pose in response to the distance measure meeting a first criterion that includes a requirement that a distance between the view pose and a pose of the viewing region exceeds a first threshold.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Figure 1:
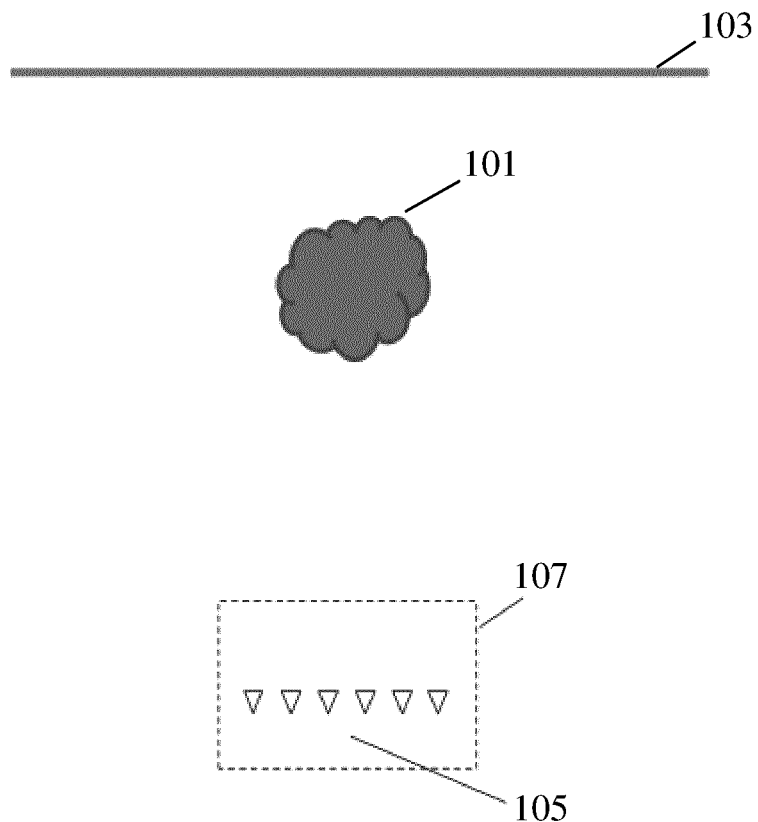
FIG. 1 illustrates an example of an image and depth capture of a 3D object.

In many Augmented Reality (AR), Mixed Reality (MR), or even Virtual Reality (VR) applications it may be desirable to add a separate or additional 3D object to the perceived environment. For example, for AR and MR, a synthesized object may be integrated/merged/overlaid a real background. As an example, a user may wear glasses or a headset that allows the user to see the real-world environment, such as the room in which the user is present, while also comprising displays that may present synthesized virtual computer graphics. The displays may be used to display views of a synthesized object such that the object may be perceived as a (virtual) object present in the room. For a VR experience, the view of the real-world may be replaced by a background that is generated from scene data representing a virtual scene. In this case, the data for the virtual scene and the 3D object may be provided and generated separately. Thus, in a VR application, a background may be generated based on scene data and this background may be overlaid by computer graphics generated from separate 3D data describing a 3D object.

The 3D object is presented such that it is aligned with the viewers' perspective and the views may be generated to reflect the movements and changes in pose by the user. Thus, as the user moves, the view of the 3D object changes to reflect how the 3D object would be seen if it were a real object positioned in the scene. Further, in order for the 3D object to appear to be a normal object in the scene, the views of the 3D object must be aligned with the scene. For example, it may be desirable to render the object to appear to be positioned/standing on the floor of the room and this requires the positioning of the view of the 3D object to dynamically change to match the movement of the same point on the floor in the glasses/display. E.g. in mixed reality the computer graphics object must fit the environment into which it is positioned. In order to be perceived as realistic, the object must not fall through a table or stick onto the ceiling etc.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom). The term pose may be replaced by the term placement. The term pose may be replaced by the term position and/or orientation. The term pose may be replaced by the term position and orientation (if the pose provides information of both position and orientation), by the term position (if the pose provides information of (possibly only) position, or by orientation (if the pose provides information of (possibly only) orientation.

As an example of a MR application is a teaching application where a 3D object in the form of a tutor may be generated and presented such that it appears that the tutor is present in the same room as the student/user of the application. The 3D object may thus in many scenarios be a temporality changing 3D object, such as a 3D video object.

In cases were a 3D object to be overlaid a scene is a virtual object that is fully described by complete 3D data, it may be feasible to generate suitable views for all view poses and no degradation or complications may arise for specific positions or orientations from which the scene is viewed. However, in many scenarios, the 3D object may not be fully characterized from all possible view points/poses. For example, the 3D object may be a real world object that is captured by a suitable capture operation that however only provides complete data for a limited range of poses.

As a specific example, a 3D object may be represented by captured data generated by a plurality of images (potentially including depth data) captured from a number of capture poses of a limited capture region. In order to provide sufficient data to allow high quality view synthesis/interpolation between captured view images, it is necessary for these to be close to each other. However, in order to reduce the required number of capture cameras/poses, it is often only practically feasible to cover a relatively small capture region.

An often used approach is to use what is known as a multi-view with depth (MVD) capture. In such a capture approach, a plurality of views of an object are captured resulting in the object being represented by a plurality of capture images with associated depth data for capture poses in a limited capture region. The images may practically be captured by using a camera rig comprising plurality of cameras and depth sensors.

An example of such a capture system is shown in FIG. 1 which shows an object 101 to be captured in front of a background 103, which may specifically be a green screen background. A plurality of capture cameras 105 are positioned in a capture region 105. The object may in such an example e.g. be segmented out from the MVD capture images using e.g. chroma-keying techniques as known to the skilled person.

Thus, the result of the capturing may be a representation of the 3D object by a multi-view image and depth representation, i.e. by image and depth being provided for a plurality of capture poses. The multi-view image and depth representation may thus provide a description of the 3D object from a capture/viewing zone. Thus, the data representing the 3D object may provide a representation of the 3D object from a viewing zone from which visual data provides a description of the 3D object. The viewing zone comprise poses relative to the object with the included poses being the poses for which the representation provides data allowing view images to be generated. Thus, for view poses that fall within the viewing zone relative to the object, it is possible to generate view images of sufficient quality, whereas for view poses that are outside the viewing zone relative to the object, it is considered to not be guaranteed that view images of sufficient quality can be generated.

The exact selection/determination/characterization of the viewing zone (typically represented by a border, outline or edge thereof) will of course depend on the specific preferences and requirements of the individual embodiment. For example, in some embodiments, the viewing zone may be determined to correspond directly to the capture zone, i.e. it may be a zone that is spanned by the capture poses. In many embodiments, the viewing zone may be determined to comprise poses for which a distance measure between the pose and the nearest capture pose meets a criterion.

Thus, data denoted/designated/considered to represent the 3D object for poses within a viewing zone but not for poses outside the viewing zone may be generated. The viewing zone is determined relative to the 3D object, and may reflect the specific capture process used (such as e.g. the camera rig). The viewing zone may be described/defined with reference to a capture or object coordinate system and may be defined independent of the scene and scene coordinate system.

In many embodiments, the viewing zone may be defined as a subset of poses of an $R^N$ space where N may be the number of dimensions considered. In many embodiments, such as specifically many 6DoF applications, N is equal to 6 and will typically correspond to three coordinates/dimensions indicating position and three coordinates indicating orientation (/direction/rotation). In some embodiments, N may be less than 6 corresponding to some dimensions not being considered (and specifically either ignored or being considered fixed).

In some embodiments, only position dimensions or coordinates are considered and in some embodiments only orientation dimensions are considered. However, in many embodiments at least one position dimension and one orientation dimension is considered.

The viewing zone is at least two dimensional and includes poses for which at least two coordinates/dimensions have different values. In many embodiments, the viewing zone is at least three dimensional and includes poses for which at least three coordinates/dimensions have different values.

The viewing zone is typically at least a two-dimensional or three dimensional zone. The viewing zone comprises poses varying in at least two dimensions.

In many embodiments, the viewing zone includes poses with different orientations relative to the object pose. Thus, the viewing zone typically has a non-zero extension for at least one orientation coordinate/dimension.

In most embodiments, the viewing zone has an extension for at least one orientation dimension and at least one position dimension. Thus, in most embodiments, both position and orientation are considered by the system.

Figure 2:
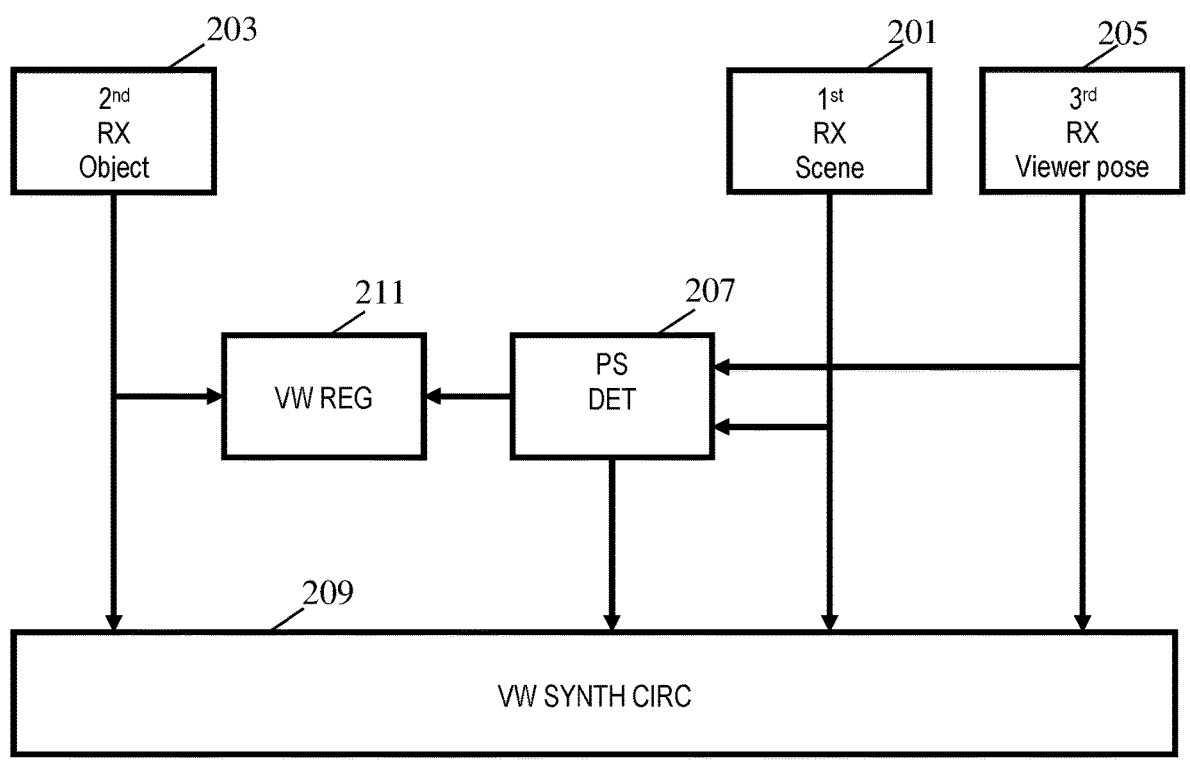
FIG. 2 illustrates an example of elements of an image synthesis apparatus in accordance with some embodiments of the invention.

FIG. 2 illustrates an example of an image synthesis apparatus which may be used to provide AR/MR/VR experiences wherein a 3D object as described above may be included in a scene. The description will focus on an MR application such as e.g. where a dynamic 3D object in the form of a tutor may be overlaid the user's perception of the surrounding real world environment. However, it will be appreciated that in other embodiments, the described principles may be used to provide e.g. a VR experience.

The image synthesis apparatus comprises a first receiver 201 which is arranged to receive scene data that describes at least part of a three dimensional scene. For an AR/MR application the scene is specifically the real-world scene in which the user is present. Thus, the scene data may describe properties of the room/environment in which the user is present. For a VR experience, the scene data may describe properties of a virtual scene. The scene data may specifically include data describing positions and/or outline of one or more objects in the scene.

The scene data may describe elements or properties of the scene in which the 3D object is to be inserted. For an AR/MR application, the scene data may describe properties of the real-world environment and specifically may describe a property of one or more objects in the real-world. The scene data may specifically describe the position and outline of one or more objects in the local environment. The objects may include walls, furniture or any other objects that are present in the environment.

The scene may for such a case e.g. be determined by a manual entry or by a scanning of the real world environment. In many cases, this may be done at the initialization of the application or may e.g. be done on a more permanent basis for static environments.

For a VR application, the scene data may include data describing the positions of objects etc. and may further comprise visual data for the objects. Specifically, the scene data may be a full model of a 3D scene. Thus, in VR applications, the scene data may comprise sufficient data to allow views of the virtual scene to be generated.

The scene data is provided with reference to a scene coordinate system, i.e. the position of objects in the scene can be evaluated with respect to a scene coordinate system. It will be appreciated that in some scenarios, scene data may be stored or received in accordance with one scene coordinate system, and this may be transformed into a different scene coordinate system as part of the processing, e.g. as part of the rendering of the application.

The image synthesis apparatus further comprises a second receiver 203 which is arranged to receive object data that describes a 3D object which is to be overlaid/merged into the scene represented by the scene data (e.g. a real or virtual scene depending on the application).

The object data may provide visual data for the 3D object from a viewing zone relative to the 3D object. Thus, the viewing zone may be defined relative to the 3D object and comprise/describe poses relative to the 3D object from which the object data comprises sufficient data to allow an image (with acceptable quality) to be generated. As previously described, the exact criterion for determining the viewing zone may depend on the preferences and requirements of the individual embodiment.

In many embodiments, the received object data may include an indication of the viewing zone. For example, object data may be generated by an MVD capture as previously described and together with the images and depth maps, an indication of a viewing zone may be included in the object data. In other embodiments, the viewing zone may be determined by the second receiver 203 itself. For example, the object data may comprise an indication of the capture poses for each of the provided images (relative to the 3D object) and the second receiver 203 may proceed to determine the viewing zone to include the poses for which the distance to one of the captures poses is less than a threshold. The specific distance measure used, and the value of the threshold, can be selected depending on the specific design criteria for the specific embodiment.

The viewing zone is defined relative to the 3D object and may be provided in accordance with a coordinate system which may be referred to as an object or capture coordinate system. The coordinate system may be one that the object data is referenced with respect to and may be independent of the scene. The viewing zone may e.g. be described by a region with a given distance and direction from the 3D object. For example, the viewing zone may be represented by a pose offset vector to e.g. a center point of a region defined by a set of intervals for each coordinate component (e.g. an interval for each of the six coordinates defining a pose in the object coordinate system).

The image synthesis apparatus comprises a third receiver 205 which is arranged to receive a view pose for a viewer in the three dimensional scene. The view pose represents a position and/or orientation from which the viewer views the scene, and for a VR application it provides a pose for which views of the scene should be generated.

The first, second, and third receivers may be implemented in any suitable way and may receive data from any suitable source, including local memory, network connections, radio connections, data media etc.

The receivers may be implemented as one or more integrated circuits, such as an Application Specific Integrated Circuit (ASIC). In some embodiments, the receivers may be implemented as one or more programmed processing unit, such as for example as firmware or software running on a suitable processor(s), such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The image synthesis apparatus further comprises a pose determiner circuit 207 which is arranged to determine an object pose for the 3D object in the scene and specifically in the scene coordinate system. The object pose specifically indicates a position and/or orientation for the 3D object in the scene/scene coordinate system. Thus, the pose determiner circuit 207 may specifically determine where in the scene the 3D object should be positioned and how it should be oriented.

The pose determiner circuit 207 may be implemented in any suitable way including as one or more integrated circuits, such as an Application Specific Integrated Circuit (ASIC). In some embodiments, the receivers may be implemented as one or more programmed processing unit, such as for example as firmware or software running on a suitable processor(s), such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The image synthesis apparatus further comprises a view synthesis circuit 209 which is arranged to generate a view image for the 3D object, and specifically it may generate an image object corresponding to the 3D object as seen from the view pose with this being positioned and oriented as indicated by the object pose. The view image may specifically only comprise an image object corresponding to the view of the 3D object. For example, in some embodiments, a full view image may be generated corresponding e.g. to the full area of a display (e.g. of glasses or a headset) with only pixels corresponding to the view of the 3D object being included and with all other pixels being transparent. Such an image may directly be displayed by a display. In other embodiments, the generated view image may an image object that may be positioned at a suitable position on a display. In such scenarios, the view image/image object may be associated with position information that indicates the position of the view image/object in the display.

For a VR application the image synthesis apparatus may further be arranged to generate image parts reflecting the virtual scene from the scene data.

The view synthesis circuit 209 may be implemented in any suitable way including as one or more integrated circuits, such as an Application Specific Integrated Circuit (ASIC). In some embodiments, the receivers may be implemented as one or more programmed processing unit, such as for example as firmware or software running on a suitable processor(s), such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The image synthesis apparatus may thus be arranged to generate view images for the 3D object from the visual data of the object data that describes visual properties of the 3D object, the object pose, and the view pose. The view image thus comprises a view of the three dimensional object at the object pose and from the view pose.

It will be appreciated that typically a stereo image/image object is generated comprising a view image/object for the right eye and the view image/object for the left eye. Thus, if the view images are presented to the user, e.g. via an AR/VR headset, it will appear as if the 3D object is indeed present as a 3D object in the scene.

It will be appreciated that many algorithms and approaches are known for synthesizing images and that any suitable approach may be used by the view synthesis circuit 209.

The image synthesis apparatus may thus generate view images for the 3D object and may merge/overlay these on a scene. The view of the 3D object is generated such that it may for example appear at a specific position and with a specific orientation in the room in which the user currently is present.

Further, as the view pose may change dynamically, corresponding to the user moving around in the scene, the view of the 3D object may continuously be updated to reflect the changes in the view poses. The position of the 3D object and the parts of the 3D object that are included in the view image object may thus change dynamically such that it appears that the object remains at the same position and with the same orientation, i.e. to the user it may seem that object is static in the scene/environment as the user moves.

The view synthesis circuit 209 is thus arranged to generate the view of the three dimensional object to be from a different angle for a sideways movement of the view pose with respect to the object pose. If the viewer pose changes such that it is in a different direction/orientation from the object pose, the view synthesis circuit 209 is arranged to generate the view of the three dimensional object to be from a different angle. Thus, as the viewer pose changes, the object can be perceived to be static and with a fixed orientation in the scene. The viewer may effectively move and see the object from a different direction. The object may specifically be presented such that it is perceived like a real object in the scene.

Figure 3:
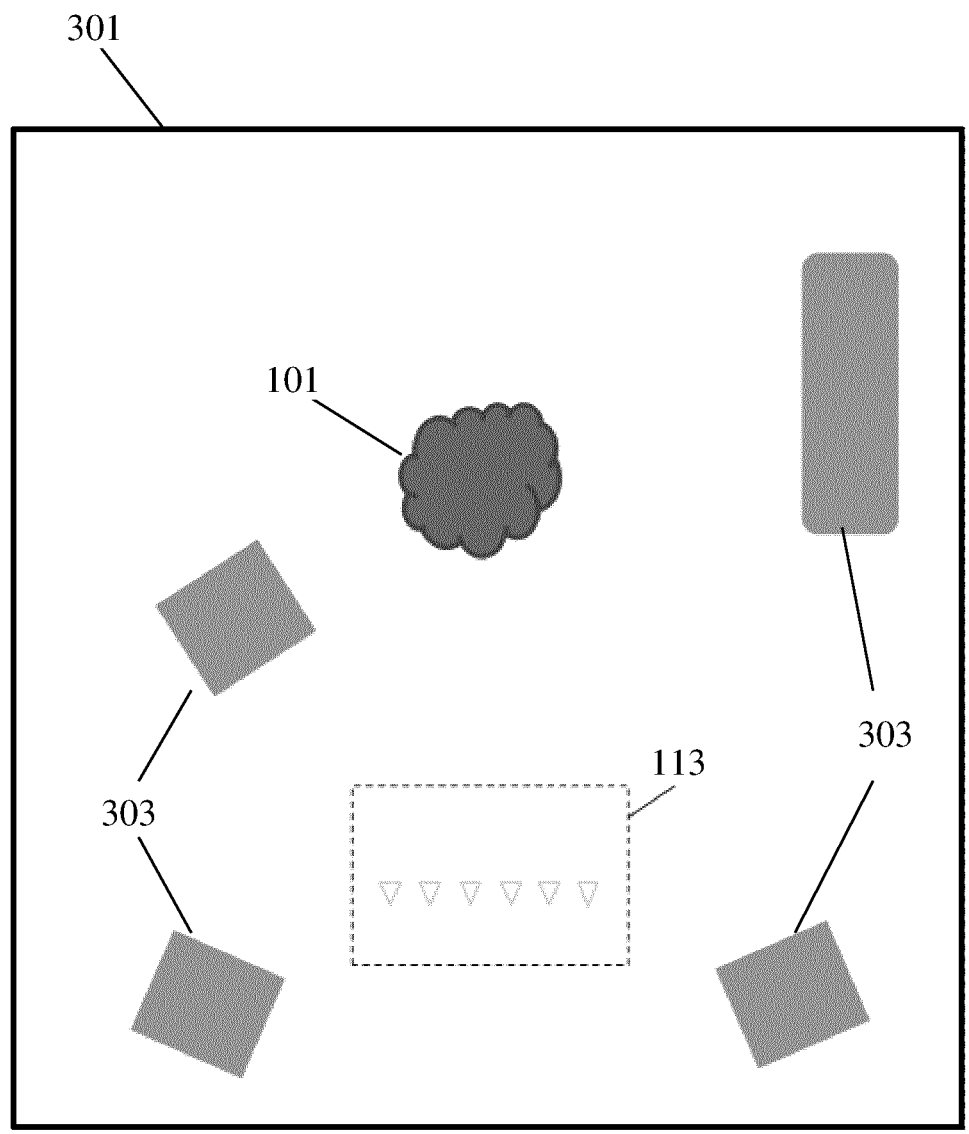
FIG. 3 illustrates an example of a scene in which a virtual 3D object elements are presented in accordance with some embodiments of the invention.

FIG. 3 may illustrate a specific example where the virtual 3D object 101 is positioned within a scene that is the real-world room in which the user is present. The room may comprise walls 301 and some room objects 303 such as e.g. furniture.

The scene data may describe the positions of the walls 301 and of the room objects 303 as well as the outline of these with respect to a scene coordinate system. The object pose for 3D object is determined with respect to the same scene coordinate system, as is the view pose (either by directly being received with reference to this scene coordinate system or by being translated to this scene coordinate system).

As the 3D object is to be included such that it is perceived as an object in the scene, the view pose thus also represents the viewpoint and orientation from which the 3D object is to be viewed, i.e. it represents the pose for which views of the 3D object should be generated.

The initial object pose when starting the application may be determined in accordance with any suitable criterion or algorithm. For example, in some embodiments, the user may manually provide an input that sets an initial position and orientation for the 3D object. In many embodiments, the initial object pose may be set automatically based on typically the object data and the scene data. The initial object pose may be set such that the object is at a distance to any of the objects and such that it appears to be standing on the floor. For example, an initial object pose may be set as far away from scene walls and furniture as possible. This can have an advantage when the viewer translates outside of the viewing regions since then the object will not directly collide with scene objects and hence there will not be a need for a sudden jump to a very different position in the scene. As another example, in case the object is a person, it may be that the person is explaining a certain property, e.g. a machine, kitchen, piece of furniture that is present in the scene. In that case, the initial pose must be selected such that it relates optimally to the object that is explained. For instance, the person may point to a given object in the scene in which case the pose is critical for a correct perception.

A particular requirement for the determination of the initial object pose may be that it should be such that the received object data allows an image of the 3D object 101 to be generated. Thus, the initial object pose may be required to be such that the initial view pose with respect to the initial object pose matches the relationship between the 3D object and the viewing zone.

The image synthesis apparatus comprises a view region circuit 211 which is arranged to determine a viewing region in the scene/scene coordinate system for the current object pose. The viewing region is a region in the scene/scene coordinate system that corresponds to the viewing zone for the current object pose. As described, the object data is associated with a viewing zone which is a set of poses relative to the object pose for which the object data is considered to be valid for generation of image content (of a sufficient quality) representing views of the object. This relative viewing zone corresponds to a viewing region in the scene/scene coordinate system, i.e. in the scene/scene coordinate system there is a viewing region comprising poses for which the received object data is considered valid.

In some embodiments, the viewing zone may be referenced to an object or capture system which is independent of the scene coordinate system whereas the viewing region is referenced to the scene coordinate system. The view region circuit 211 may be arranged to transform between these based on the object pose.

The view region circuit 211 is arranged to determine this viewing region that corresponds to the viewing zone for the current object pose.

For example, if the viewing zone is given by an offset vector relative to the pose of the 3D object, the corresponding pose in the scene coordinate system for the current object pose may be generated by offsetting the current object pose by this vector. The viewing zone may for example be given as a predetermined region around the pose indicated by the offset vector and the viewing region may be determined as a corresponding predetermined region around the pose resulting from offsetting the current object pose by the offset vector.

As another example, the capture positions relative to the object may be indicated and the corresponding capture positions in the scene coordinate system for the current object pose may be determined. The viewing region may then be determined e.g. as the set of poses for which a suitable distance measure is below a threshold.

It will be appreciated that many algorithms and approaches are known for translating between different coordinate systems and that any suitable approach may be used without detracting from the invention.

Similarly to the viewing zone, the viewing region may be defined as a subset of poses of an $R^N$ space where N may be the number of dimensions considered. In many embodiments, such as specifically many 6DoF applications, N is equal to 6 and will typically correspond to three coordinates/dimensions indicating position and three coordinates indicating orientation (/direction/rotation). In some embodiments, N may be less than 6 corresponding to some dimensions not being considered (and specifically either ignored or being considered fixed).

In some embodiments, only position dimensions or coordinates are considered and in some embodiments only orientation dimensions are considered for the viewing region. However, in many embodiments at least one position dimension and one orientation dimension is considered.

The viewing region is at least two dimensional and includes poses for which at least two coordinates/dimensions have different values. In many embodiments, the viewing region is at least three dimensional and includes poses for which at least three coordinates/dimensions have different values. The viewing region is typically at least a two-dimensional or three dimensional zone. The viewing zone comprises poses varying in at least two dimensions.

In many embodiments, the viewing region includes poses with different orientations relative to the object pose. Thus, the viewing region typically has a non-zero extension for at least one orientation coordinate/dimension.

In most embodiments, the viewing region has an extension for at least one orientation dimension and at least one position dimension. Thus, in most embodiments, both position and orientation are considered.

The view region circuit 211 may be implemented as an integrated circuit such as an Application Specific Integrated Circuit (ASIC). In some embodiments, the view region circuit 211 may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

In the system, the pose determiner circuit 207 is arranged to determine a distance measure for the view pose relative to the viewing region for the object pose. The distance measure may in some embodiments be a simple binary distance measure which indicates whether the view pose is within the viewing region or whether it is outside of this. Such a distance measure may be generated simply by comparing the pose coordinates with the current range of pose coordinates for the current viewing region. As a specific example, the difference vector between the view pose and the pose indicated by the offset vector may be determined, and if this vector is smaller than the extension of the viewing zone/region in the corresponding direction (e.g. from a center reference position), then the distance measure indicates that the view pose is within the viewing region and otherwise it indicates that it is outside the viewing region.

As another example, in some embodiments, a distance measure may be generated which generates a value that indicates a distance from the current view pose to a pose of the viewing region. This pose of the viewing region may for example be a fixed reference pose (such as the pose indicated by the offset vector) or may be dependent on the view pose, such as being the nearest pose within the viewing region. The distance measure may for example determine a difference value for each coordinate of the poses and then combine these into a combined value that can be used as a distance measure. For example, for the position coordinates a Euclidian distance measure can be determined and for orientation coordinates summations of absolute coordinate differences may be used (or e.g. a simple angle difference between vectors indicating a direction of the poses may be used).

The pose determiner circuit 207 is further arranged to evaluate whether the distance measure meets a first criterion which includes a requirement that a distance between the view pose and a pose of the viewing region exceeds a first threshold.

The pose determiner circuit 207 may thus determine whether the current view pose is further from the viewing region than a given amount in accordance with any suitable distance determination and requirement. It will be appreciated that the criterion may also include other considerations, such as for example a frequency of detections, a time since last detection, a user preference setting etc. It will also be appreciated that the threshold may be dynamically adaptable in some embodiments (e.g. based on the previously mentioned parameters). Indeed, in many embodiments, the applied threshold may be determined as a function of different parameters, and as such may for example be direction dependent (e.g. allowing a larger distance for sideways movement than for movement directly towards or away from the current object pose).

In many embodiments, the pose determiner circuit 207 may simply detect whether the current view pose is within the viewing region or not, for example simply by determining whether a binary measure indicates that the view pose is within the viewing region or not. In other embodiments, more complex approaches may be used such as for example comparing a non-binary distance measure to a dynamic threshold value. In some embodiments, the first criterion may include the requirement that a distance between the view pose and any pose of the viewing region exceeds a first threshold. The threshold may in this case be set to zero, i.e. if the distance between the view pose and any pose of the viewing region exceeds a zero threshold, then the requirement is met.

In many embodiments, the first criterion may include the requirement that a distance between the view pose and a reference pose of the viewing region exceeds a first threshold. The reference pose may be independent of the viewer pose for the requirement not being met. The reference pose may be fixed as long as the requirement is not met. In some embodiments, the reference pose may be changed when the requirement is met (and specifically when the object pose is changed).

The pose determiner circuit 207 is further arranged to change the object pose in response to a detection that the distance measure meets the first criterion. Thus, the pose determiner circuit 207 may detect that the current view pose moves to be outside (e.g. by a certain distance) the viewing region and in response to this it may change the object pose, i.e. it may change where the 3D object is in the scene and/or the orientation of the 3D object in the scene.

The viewing region may be seen as a representation of the viewing zone in the scene/scene coordinate system for the current object pose, and it accordingly indicates a region in the scene for which the object data is considered to provide sufficient data for views of the object to be generated. The pose determiner circuit 207 may thus determine that the view pose has changed to a degree where the object data cannot be relied on to provide sufficiently complete and accurate data for a view of the 3D object to be generated with sufficiently high quality.

The detection may result in a change in the object pose such that the new view pose falls within the viewing region for the new object pose. Thus, specifically, the new object pose that the pose determiner circuit 207 determines may be subject to a requirement that the first criterion is not met for the new object pose, i.e. the new object pose must be selected such that the new viewing region that corresponds to the viewing zone for the new object pose is such that the distance measure for the new view pose and the new object pose does not meet the first criterion. Thus, the new object pose is selected such that the view pose is not too far from the viewing region for the new object pose.

As a specific example, the new object pose may be determined such that the new/current view pose falls within the viewing region for the new object pose.

It will be appreciated that the exact algorithm or selection criterion for determining the new object pose will depend on the specific embodiment and that many different approaches may be used. Some particularly advantageous considerations and criteria will be described in more detail later.

The pose determiner circuit 207 may be arranged to not change the object pose for varying view poses in scenarios where a given criterion is met, such as a criterion or requirement that the distance measure meets a criterion which includes a requirement that the distance does not exceed a second threshold.

Thus, in many embodiments, the object pose may be fixed or permanent for at least some situations and scenarios. Specifically, in many embodiments, the object pose may be unchanged as long as the firsts criterion is not met, and the object pose may only be changed when it is determined that the view pose has moved too far from the viewing region.

For example, in some embodiments, the pose determiner circuit 207 may proceed to keep the object pose fixed as long as the view pose is within the viewing region and to (only) change the object pose when the distance measure indicates that the view pose moves outside the viewing region. When the view pose moves outside the viewing region, the object pose is changed such that the viewing region for the new object pose includes the current view pose.

The approach may provide an improved experience to the user in many embodiments and scenarios. For example, for an MR application, a 3D object e.g. representing a tutor may be presented such that it is perceived to be at one particular position in the room and facing the user. If the user moves by a relatively small amount (such that he stays in the viewing region), the 3D object/tutor will appear to behave as a real object, i.e. the user can move to the side and see the tutor from a different angle etc. Further, the presented image is at a high quality. If the user however moves so far from the initial pose that he moves outside the viewing region, the system does not continue to just render views of the 3D object/tutor from the new pose as this would be at low quality due to the incomplete data being provided by the object data.

Rather, instead it is detected that the user has moved too far from the initial pose (e.g. outside the viewing region), and the 3D object/tutor is changed to a new position and/or orientation. For example, the 3D object/tutor may "jump" to a new position in the room such that it is now seen e.g. directly in front of the current view position, and/or the orientation is changed such that e.g. it is perceived that the tutor has rotated/turned to again directly face the user.

The approach may in particular in many embodiments ensure that the perceived quality of the 3D object is always sufficiently high and it may be ensured that it is always possible to render the 3D object based on the available object data. A higher minimum guaranteed quality can be ensured for a service. At the same time, for most typical movements, a natural experience can be achieved with the views of the 3D object following the movements of the user (e.g. parallax etc.).

The described experience may be highly advantageous for many applications such as for example teaching applications where a student will typically move relatively little except for at infrequent times. For example, a student may be presented with a natural perception of a tutor as long as the student remains at a desk. However, if he gets up and moves to a chair in a different part of the room, the system may automatically reposition and/or reorient the tutor to provide a corresponding experience for the student at this new location.

Thus, the view synthesis circuit 209 is arranged to generate the view of the three dimensional object to be from a different angle for at least some movements of the view pose for which the distance does not exceed the first threshold. Specifically for any movement that does not result in the distance exceeding the first threshold but which comprises a movement component perpendicular to a direction from the object pose to the viewer pose, the generated view of the object will correspond to a different viewing angle of the object.

It will be appreciated that this will inherently be the case for any distance and threshold determination that allows any two dimensional movement and which keeps the object pose constant for changing viewer poses. For example, a two (or higher) dimensional viewing zone may lead to a two (or higher) dimensional viewing region, which may lead to movements for which the threshold is not met to include movements with perpendicular components, and thus with different viewing angles of the object when the object pose is constant.

In many embodiments, the first threshold is such that the distance does not exceed the first threshold for at least some view poses being in different directions from the object pose. Accordingly, a change between such view poses will not result in a new object pose being generated but will result in the view pose being in a different direction from the object, i.e. the object is viewed or seen from a different angle. Thus, keeping the object pose constant for such changes in view pose will result in the view of the object being generated for a different view angle, i.e. the object is seen from a different angle corresponding to the movement of the viewer. Accordingly, in such embodiments, when the first threshold is not met, the view of the object may appear to be a normal 3D object in the scene and thus a more natural perception is achieved.

The distance measure and/or first threshold may in many embodiments include an orientation component. Thus, the distance may be dependent on a difference in orientation between the view pose and the pose of the viewing region. The threshold may likewise include a consideration of the orientation.

In many embodiments, the distance/first threshold may thus include an orientation distance contribution. In most embodiments, the distance/first threshold may include both a position distance contribution and an orientation distance contribution. In some embodiments, the distance and/or first threshold may be multicomponent values, e.g. they may be considered vectors.

As an example, the first threshold may be exceeded if one component of the distance measure exceeds a threshold, such as e.g. if the difference in one of the components of the view pose relative to the object pose exceeds a threshold value. Specifically, if the orientation of the view pose changes such that at least one of the orientation values differ from the corresponding orientation values for poses within the viewing region by more than a threshold value contained in the first threshold, then the pose determiner circuit 207 may proceed to determine a new object pose.

In some embodiments, the first threshold may be an adaptive threshold. Specifically, in some embodiments, the pose determiner circuit 207 may be arranged to adapt the threshold in response to a property of the object data and/or a property of the viewing zone.

For example, the pose determiner circuit 207 may be arranged to adapt the threshold depending on the object data such as e.g. based on the number and/or angular density of views provided for an object represented by a multi-view and depth representation. For example, the more views that are provided and the higher angular density, the larger the threshold may be set, thereby leading to the object pose being kept constant for a larger region. As another example, the threshold may be adapted based on a size of the missing part of a texture mesh used to represent the object. For example, the smaller the amount of an object for which no texture map is provided, the larger the threshold may be, resulting in the region for which the object pose is not changed increasing.

As another example, the pose determiner circuit 207 may be arranged to adapt the threshold based on a property of the viewing region. For example, it may adapt the threshold based on the size of the viewing region. In such an example, the threshold may be increased for a smaller viewing region and reduced for a larger viewing region. This may in many embodiments provide a more advantageous trade-off between the user experience of a natural 3D effect for the object (e.g. a natural parallax, a perception of the object being a real object in the scene) and the image quality of the presented object (e.g. the amount of synthesis artefacts and errors).

The pose determiner circuit 207 may as mentioned be arranged to change the object pose when a view pose change meeting the first criterion is detected. In some embodiments, the orientation of the object pose may be changed such that the object pose is reoriented in the environment. For example, if the user moves too far to the side of the 3D object such that the object data does not provide sufficient data to render accurate views of the 3D object (e.g. no data is provided for the back or rear sides of the 3D object), the pose determiner circuit 207 may change the object pose such that the 3D object appears to be rotated to e.g. again face the user.

Alternatively or additionally, the pose determiner circuit 207 may change the object pose to change the position of the 3D object in the scene. For example, if the user moves too far to the side of the 3D object such that the object data does not provide sufficient data to render accurate views of the 3D object (e.g. no data is provided for the back or rear sides of the 3D object), the pose determiner circuit 207 may change the object pose such that the position of the 3D object in the scene is directly in front of the viewer, i.e. such that the 3D object again would be seen directly from the front.

It should be appreciated that the described approach of changing the object pose when the first criterion is met is not dependent on any specific operation or other criteria being applied to determine the object pose whether initially or before or after then change (subject to the new object pose after the change resulting in the first criterion not being met). Rather, it is indeed an advantage of the approach that it is useful with, and suitable for, almost any algorithm or criterion that is otherwise used for determining the object pose. It does not require any specific initialization or constraint but can for example be implemented as an "overlay" or "control operation" on top of any desired algorithm used to determine the object pose. For an object pose, if the view poses change such that the first criterion is met, then a change may be performed such that the first criterion is no longer met. This does not depend on the object pose having any specific properties or indeed on how the object pose is selected or what criterion/algorithm is used for this determination/selection.

In particular, it is not dependent on any specific algorithm being used for determining object pose based on either view pose or on the scene data. The additional operation of the claimed concept can overlay diverse algorithms and do not depend on how the object pose may otherwise be selected.

The determination of the object pose based on the scene data provides for the object to be related to the scene.

However, the exact way that this is done will depend entirely on the preferences and requirements of the individual embodiment and the operation of changing the object pose based on the distance measure is not restricted to any specific requirement, preference, or approach for determining the object pose based on the scene data. For example, in some embodiments, it may be desired to determine an initial object pose to be as far from any object in the scene as possible, in other embodiments, it may be desired to determine an initial object pose to be immediately next to a specific object, in yet other embodiments it may be desirable to position the object in front of a part of the scene with which the object contrasts (e.g. a bright object is positioned in front of a dark scene element) etc, etc. The determination of the object pose as a function of the scene data is entirely a design decision and the approach is not restricted to any specific operation.

Similarly, the dependency of the object pose on the view pose of the claimed concept is that the object pose is changed if it is detected that the view pose changes such that a first criterion is met with the change being such that the new object pose will result in the first criterion being met after the change. This concept and operation defines a dependency of the object pose on the view pose. It is not conditional or necessitated upon any other approach or algorithm that may be used to select an object pose based on the view pose, or indeed if a view pose is used further when determining the object pose. In particular, the concept is not dependent on any specific approach used to determine an initial object pose. This is entirely a design choice for the individual embodiment.

Specifically, the operation, and the advantages is not limited to any specific determination of the initial object pose or on any specific selection of an initial object pose. As an example, the system may be started with a determination of an initial pose that is selected such that the object is in front of a dark part of the scene (e.g. in the sky for a night time scene) but otherwise the object pose may be selected entirely at random. The system may then evaluate the distance measure and first criterion for the initial object pose and for the current view pose. If this evaluation determines that the first criterion is met, the system may proceed to change the object pose to a pose for which the first criterion is no longer met. Thus, even if e.g. an existing algorithm or application generates an undesirable initial object pose, the approach may e.g. be used as an additional control that corrects this initial object pose to a desirable object pose. Thus, rather than being dependent on any specific algorithm or approach for determining an object pose, the approach may in fact be used to extend the diversity of algorithms for determining an object pose as it can be used to correct or compensate for undesirable outcomes of such algorithms.

The approach is not at all dependent on or related to the initial pose being e.g. a pose selected by an author, or even on it being a desirable position. The approach may not be used to maintain a desirable pose for an object, but rather could be used to allow the opposite effect namely that the object pose is automatically changed such that it is suitable for the current view pose. Thus, rather than seeking to impose a specific object pose, it may allow this to be freely determined and then changed if it does not meet the first criterion. It may allow more freedom for the algorithm determining the object pose as it can be ensured that the object pose will be changed if the image quality cannot be ensure as indicated by the first criterion being met.

In most embodiments, the pose determiner circuit 207 may be arranged to modify both the orientation and the position of the object pose and accordingly the 3D object.

In some embodiments, a reference pose may be designated for the viewing zone. For example, in many embodiments, a preferred pose for generating images of the 3D object may be defined. For example, a reference pose may be a central pose or average pose for all poses comprised in the viewing zone or may e.g. be one of the capture poses. Thus, the reference pose may in many embodiments indicate a preferred pose for views of the 3D object.

The pose determiner circuit 207 may be arranged to change the object pose by aligning the current view pose with the reference pose of the viewing zone. For example, the new object pose may be selected such that it will result in the reference pose of the viewing zone mapping to the current view pose. The reference pose of the viewing zone may be defined relative to the 3D object and may map to a corresponding reference pose in the viewing region in the scene. The alignment of the reference pose with the view pose thus repositions the 3D object in the scene such that it is positioned at the preferred position, such as where the optimum quality can be achieved or e.g. to provide the biggest distance to the edge of the viewing region thereby reducing the number of changes required.

As a specific example, the pose determiner circuit 207 may determine a new object pose using the offset vector. For example, the new object pose may be determined as the pose coordinates of the view pose after subtraction of the pose coordinates of the offset vector.

The approach may provide advantageous operation and user experience in many embodiments. It may for example provide an effect where a user can move freely around while remaining in the viewing region. However, if the view pose deviates by too much, the system may effectively reset the presentation of the 3D object by resetting the position and orientation of the 3D object to the preferred relationship with the current view pose.

In many embodiments, other parameters or constraints may also be considered and the alignment between the reference pose and the view pose may only be one consideration. However, in such cases, it may still be desirable to align the reference pose and view pose as much as possible (in view of other considerations) and the pose determiner circuit 207 may accordingly bias the selection of the new object pose towards an alignment of the view pose and reference pose.

In many embodiments, the pose determiner circuit 207 may be arranged to determine the new object pose such that occlusions for the current view pose are avoided.

Specifically, the pose determiner circuit 207 may be arranged to determine the new object pose such that the 3D object is not occluded by any scene objects described by the scene data. For example, based on the scene data, the pose determiner circuit 207 may determine all poses in the scene for which there is a direct line of sight to the view pose which is not intersected by any scene objects. The new object pose may then be selected from these poses in accordance with a given preference requirement (e.g. as close as possible to aligning to the reference pose, the minimum pose change etc.).

In some embodiments, the pose determiner circuit 207 may be arranged to determine the new object pose such that the 3D object does not occlude a set of one or more scene objects in the scene. The set of scene objects may include all scene objects described by the scene data or may e.g. only include a subset of these, e.g. only a specific type of objects.

For example, based on the scene data, the pose determiner circuit 207 may determine positions corresponding to the surface of all scene objects that are not walls. For each of the positions, a direct line of sight may be traced to the current view pose and the object pose may be determined subject to the constraint that the 3D object does not intersect any of these lines.

In some embodiments, the pose determiner circuit 207 may be arranged to determine the new object pose following the change in object pose such that there is no overlap between a set of scene objects and the 3D object when positioned and orientated in accordance with the new at the object pose. Again, the set of scene objects may comprise all scene objects or only a subset of these.

The pose determiner circuit 207 may for example determine a preferred object pose, e.g. in response to a preference measure such as the closest alignment of the reference pose to the current view pose or the minimal change in object pose. It may then determine the outline of the 3D object for this pose. If this does not result in an overlap with the scene objects, the new object pose may be set to this value and otherwise the object pose may be shifted until no overlap occurs.

As another example, in some embodiments, the largest cross-section dimension of the 3D object (the farthest distance between two points of the 3D object) may be determined and the new object pose may be selected subject to the requirement that the distance to any scene object of the set of scene objects must be larger than this largest cross-section dimension.

In many embodiments, the pose determiner circuit 207 may be arranged to bias the determination of a new object pose towards an object pose for which the difference relative to the object pose prior to the change is minimized. In some embodiments, the smallest change possible while meeting other requirements for the selection of the new object pose may be selected. For example, all the poses in the scene/scene coordinate system for which the object will not occlude any scene objects and for which the 3D object does not overlap a scene object may be determined. The difference between these poses and the previous object pose may be determined in accordance with any suitable distance measure (e.g. smallest Euclidian distance between positions and the smallest angle between orientations). The new object pose may then be selected as the one for which the smallest distance measure is found.

Such an approach may result in the perceived jumps in the presentation of the 3D object being minimized as much as possible.

The described system may for example be useful in applications where a 3D object is synthesized from MVD content which is limited to a viewing zone. The viewer's position as indicated by the view pose cannot deviate too much from the original camera positions without a reduction in quality of the resulting image (if one can actually be generated). The exact degradation depends on the proximity to the viewing region and on the complexity of the captured object etc. For larger deviations from the captured positions/viewing region, the depicted 3D object will suffer from distortions due to e.g. lack of de-occlusion data or depth map inaccuracies. FIG. 1 illustrates an example of the capture of an MVD object and FIG. 3 illustrates how this may be visualized as computer generated images in a real or virtual room. A problem in such a situation is that the viewer has a limited viewing region determined by the MVD-object capture whereas the viewer may desire to move around freely in the entire room. The described approach may address this and provide a system where the viewer can move around the room while maintaining a good quality for the visualization of the 3D object.

This may specifically be achieved by effectively allowing the visualized 3D object to "snap" around the room in a constrained fashion. For example, when the viewer moves out of the viewing zone, the 3D object is both re-positioned (snaps) and re-oriented such that the observer is again optimally positioned at the center of the viewing zone. Multiple re-positionings and re-orientations of the AR-object are possible. Further, when remaining within the viewing region, the visualized 3D object may be dynamically changed to reflect the movements of the user thereby providing a natural experience and view of the 3D object.

The new object pose following a change may be determined such that it optimizes a given criterion under a given set of constraints: For example, the new object pose may be determined such that the position of the 3D object relative to the viewing direction of the observer changes as little as possible while ensuring that there is no collision with a scene object, such as a piece of furniture. As another example, the new object pose may be determined such that the distance between the view pose and the reference pose is as small as possible while ensuring that there is no collision with a scene object, such as a piece of furniture.

The determination of the object pose may specifically include one or more of the following considerations, and specifically in some embodiments all of these may be considered in in the following order of decreasing priority:

1. Avoid collision between 3D object and scene objects. The new object pose should be such that it does not collide with other objects such as walls or cupboards, etc. In the case of a virtual scene, collisions can be detected from the known geometries or it can be manually annotated in additional (meta) data. In case of a real scene, the valid poses may e.g. be determined using a computer vision algorithm.
2. Avoid occlusion of the 3D object by a scene object.
3. Select position of the object pose such that a minimum translation magnitude relative to the previous object position is achieved.
4. Select orientation of the object pose such that a minimum rotation angle magnitude compared with the current viewing direction is achieved.
5. If no valid pose is identified search over all poses in the scene to identify an object pose meeting the requirements.

Figure 4:
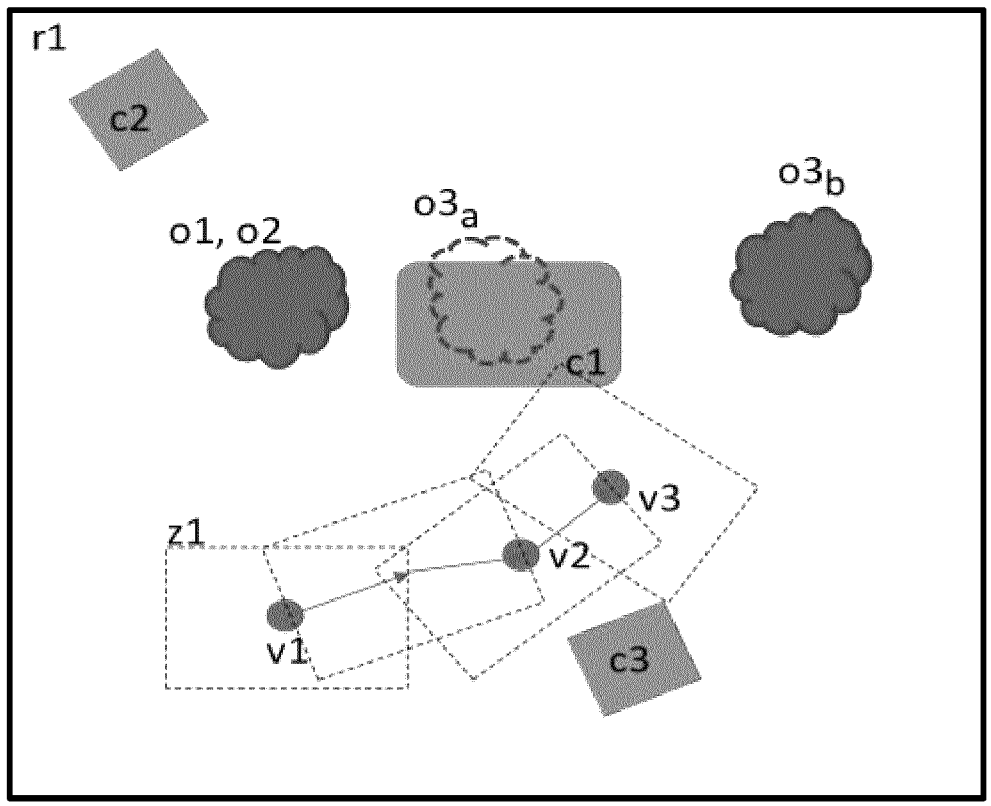
FIG. 4 illustrates an example of a scene in which a virtual 3D object elements are presented in accordance with some embodiments of the invention.

FIG. 4 illustrates a specific example for a scene in the form of a virtual or real room (r1) comprising 3 cupboards (c1,c2,c3). At time t=1, a viewer is located at viewing position v1 and the 3D object is optimally shown at o1. When the viewer moves around in the viewing region z1, o1 remains at the same position relative to r1, i.e. in the scene. At t=2, the viewer moves outside the initial viewing region to viewing position v2. The distance to o1 however remains the same. In this scenario, the position of o2 is unchanged (translation magnitude=0) with respect to o1. Only the orientation of o2 changes with respect to o1, i.e. the object rotates towards the observer. At t=3, the viewer moves to v3. For a criterion only considering minimization of the translation of the 3D object, the depicted 3D object would move to $o3_a$. However, as this results in collision, the depicted 3D object is instead moved to $o3_b$.

In more specific detail, rendering of the MVD object may include a projection from a three dimensional representation to a two dimensional representation according to the following formula:

$$\begin{bmatrix} w'x' \\ w'y' \\ w'z' \\ w' \end{bmatrix} = PVM_i \begin{bmatrix} X \\ y \\ z \\ 1 \end{bmatrix}.$$

In this equation a 4×4 model matrix $M_i$ transforms the coordinates that are local to object i to a global world coordinate system. For a captured MVD 3D object, each view in the set of views has its own initial model matrix that positions the entire set at an initial world position.

The viewing zone for the multi-view object is typically limited to some space around the original capture positions of the camera array. When the multi-view 3D object is initially placed in the scene, the viewer is placed at the center of the viewing zone e.g. by mapping the origin of the camera rig to a position close to the eyes of the viewer (as represented by the view pose). The model matrix is therefore a function of the view matrix:

$$M_i = f(V).$$

Initially the viewer is positioned by assuming that the multi-view capture was taken from his current head position:

$$M_{*,4} = V_{*,4}.$$

In a 360° graphics environment, the orientation represented by the model matrix can be arbitrary as long as there is no collision with other (graphics) objects that are already present in the scene.

Figure 5:
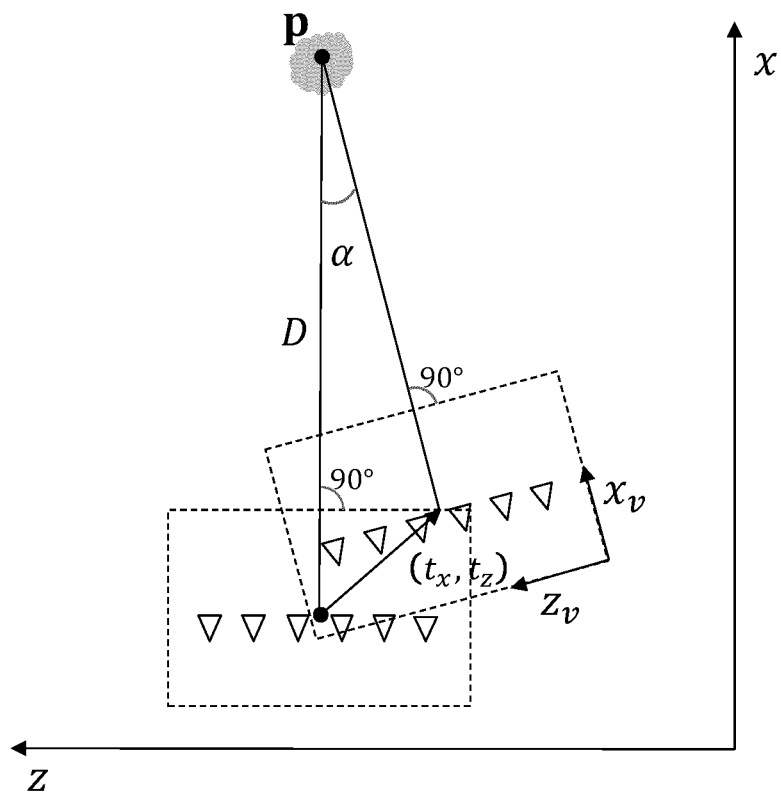
FIG. 5 illustrates an example of a processing that may be performed by an image synthesis apparatus in accordance with some embodiments of the invention.

When the viewer starts to move around in the scene it is very likely that he will move outside of the viewing zone/region. To place the viewer back in the viewing zone, the image synthesis apparatus translates and/or rotates the 3D object such that the viewing region for the new object pose encompasses the view pose. FIG. 5 shows an approach that modifies the model matrix $M_i$ of the 3D object such that the viewer is re-positioned at the center of the viewing zone. The example of FIG. 5 includes both a translation and a rotation of the 3D object.

With reference to FIG. 5, the view pose is at the boundary of the viewing region and a rotation $-\alpha$ is applied around the y-axis to the current model matrix $M_i$ followed by a translation $(t_x, t_z)$ in the xz-plane. The new model matrix then becomes:

$$M_i \leftarrow T(\alpha, t_x, t_z) M_i$$

where $$T(\alpha, t_x, t_z) = M_{translation}(t_x, t_z) M_{rotation}(\alpha)$$

The changing position of the viewer relative to the 3D object is known via view-matrix V.

In some embodiments, the detection of the view pose moving outside the viewing region may be performed in the capture coordinate system. In such an example, the position of the view pose may be translated into the capture coordinates:

$$\begin{bmatrix} sx_v \\ sx_v \\ sx_v \\ s \end{bmatrix} = T^{-1} \begin{bmatrix} x \\ y \\ z \\ 1 \end{bmatrix}.$$

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Generally, examples of an image synthesis system, a method of image synthesis, and a computer program which implements the method are indicated by below embodiments.

Embodiments

1. An image synthesis system comprising:
   a first receiver (201) for receiving scene data describing at least part of a three dimensional scene;
   a second receiver (203) for receiving object data describing a three dimensional object, the object data providing visual data for the three dimensional object from a viewing zone having a relative pose with respect to the three dimensional object;
   a third receiver (205) for receiving a view pose for a viewer in the three dimensional scene;
   a pose determiner circuit (207) for determining an object pose for the three dimensional object in the three dimensional scene in response to the scene data and the view pose;
   a view synthesis circuit (209) for generating a view image from the visual data, the object pose, and the view pose, the view image comprising a view of the three dimensional object in the three dimensional scene with the three dimensional object being at the object pose and being viewed from the view pose;
   a circuit (211) for determining a viewing region in the three dimensional scene for the object pose of the three dimensional object and the relative pose of the viewing zone, the viewing region corresponding to the viewing zone in the three dimensional scene for the three dimensional object being at the object pose;
   wherein the pose determiner circuit (207) is arranged to determine a distance measure for the view pose relative to the viewing region for the object pose, and to change the object pose in response to the distance measure meeting a first criterion that includes a requirement that a distance between the view pose and a pose of the viewing region exceeds a first threshold.

2. The image synthesis system of embodiment 1 wherein the pose determiner circuit (207) is arranged to not change the object pose for varying view poses when the distance measure meets a criterion including a requirement that the distance between the view pose and a pose of the viewing region does not exceed a second threshold.

3. The image synthesis system of any previous embodiment wherein the change of object pose includes a change of a position of the object pose.

4. The image synthesis system of any previous embodiment wherein the change of object pose includes a change of an orientation of the object pose.

5. The image synthesis system of any previous embodiment wherein the scene data includes data for at least one scene object in the three dimensional scene and the pose determiner circuit (207) is arranged to determine a new object pose following the change subject to a constraint that there is no occlusion from the view pose of the three dimensional object by the at least one scene object.

6. The image synthesis system of any previous embodiment wherein the scene data includes object data for at least one object in the three dimensional scene, and the pose determiner circuit (207) is arranged to determine a new object pose following the change subject to a constraint that there is no overlap between the at least one object in the three dimensional scene and the three dimensional object for the new view pose.

7. The image synthesis system of any previous embodiment wherein the viewing zone comprises a reference pose and the pose determiner circuit (207) is arranged to bias a new object pose following the change towards an alignment of the reference pose with the view pose.

8. The image synthesis system of any previous embodiment wherein the pose determiner circuit (207) is arranged to determine a new object pose following the change subject to a constraint that the distance measure does not meet the first criterion for the new view pose.

9. The image synthesis system of any previous embodiment wherein the pose determiner circuit (207) is arranged to bias a new object pose following the change towards a minimum pose difference relative to an object pose prior to the change.

10. The image synthesis system of any previous embodiment wherein the scene data includes data for at least one scene object in the three dimensional scene and the pose determiner circuit (207) is arranged to determine a new object pose following the change subject to a constraint that there is no occlusion from the view pose of the at least one scene object by the three dimensional object.

11. The image synthesis system of any previous embodiment wherein the pose determiner circuit (207) is arranged to perform a search over poses for a region of the scene to find a new object pose following the change for which a plurality of constraints are met.

12. The image synthesis system of any previous embodiment wherein the representation of the three dimensional object comprises a multi-view image and depth representation of the three dimensional object.

13. The image synthesis system of any previous embodiment wherein the scene data provides a visual model of at least part of the three dimensional scene and the view synthesis circuit (209) is arranged to generate the view image in response to the visual model to be a view of the scene from the view pose blended with the view of the three dimensional object.

14. A method of image synthesis comprising:
receiving scene data describing at least part of a three dimensional scene;
receiving object data describing a three dimensional object, the object data providing visual data for the three dimensional object from a viewing zone having a relative pose with respect to the three dimensional object;
receiving a view pose for a viewer in the three dimensional scene;
determining an object pose for the three dimensional object in the three dimensional scene in response to the scene data and the view pose;
generating a view image from the visual data, the object pose, and the view pose, the view image comprising a view of the three dimensional object in the three dimensional scene with the three dimensional object being at the object pose and being viewed from the view pose;
determining a viewing region in the three dimensional scene for the object pose of the three dimensional object and the relative pose of the viewing zone, the viewing region corresponding to the viewing zone in the three dimensional scene for the three dimensional object being at the object pose;
and further comprising:
determining a distance measure for the view pose relative to the viewing region for the object pose, and
changing the object pose in response to the distance measure meeting a first criterion that includes a requirement that a distance between the view pose and a pose of the viewing region exceeds a first threshold.

15. A computer program product comprising computer program code means adapted to perform all the steps of embodiments 14 when said program is run on a computer.

More specifically, the invention is defined by the appended CLAIMS.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An image synthesis system comprising:
a first receiver,
wherein the first receiver is arranged to receive scene data,
wherein the scene data describes at least a portion of a three dimensional scene;
a second receiver,
wherein the second receiver is arranged to receive object data, wherein the object data describes a three dimensional object,
wherein the object data provides visual data for the three dimensional object from a viewing zone,
wherein the viewing zone has a relative pose with respect to the three dimensional object;
a third receiver, wherein the third receiver is arranged to receive a view pose for a viewer in the three dimensional scene;
a pose determiner circuit, wherein the pose determiner circuit is arranged to determine an object pose for the three dimensional object in the three dimensional scene in response to the scene data and the view pose;
a view synthesis circuit,
wherein the view synthesis circuit is arranged to generate a view image from the visual data, the object pose, and the view pose,
wherein the view image comprises a view of the three dimensional object in the three dimensional scene,
wherein the three dimensional object is at the object pose and is viewed from the view pose;
a view determiner circuit,
wherein the view determiner circuit is arranged to determine a viewing region in the three dimensional scene for the object pose and the relative pose,
wherein the viewing region corresponds to the viewing zone is at the object pose;
wherein the pose determiner circuit is arranged to determine a distance measure for the view pose relative to the viewing region for the object pose,
wherein the pose determiner circuit is arranged to change the object pose in response to the distance measure meeting a first criterion,
wherein the first criterion comprises a requirement that a pose distance between the view pose and a pose of the viewing region exceeds a first threshold,
wherein the view synthesis circuit is arranged to generate the view of the three dimensional object to be from different angles for at least a portion of changes of the view pose for which the pose distance does not exceed the first threshold,
wherein the pose determiner circuit is arranged to determine a new object pose following at least one change of the object pose,
wherein the determination of the new object pose is subject to a constraint that the distance measure does not meet the first criterion for the new object pose.

2. The image synthesis system of claim 1, wherein the viewing region is at least a two dimensional region.

3. The image synthesis system of claim 1,
wherein the first threshold is arranged such that the pose distance does not exceed the first threshold for at least a portion of view poses,
wherein the portion of the view poses is in different directions from the object pose.

4. The image synthesis system of claim 1,
wherein the pose determiner circuit is arranged to not change the object pose for at least one of a plurality of view poses when the distance measure meets a second criterion,
wherein the second criterion comprises a requirement that the pose distance between the view pose and a pose of the viewing region does not exceed a second threshold.

5. The image synthesis system of claim 1, wherein the change of object pose comprises a change of a position of the object pose.

6. The image synthesis system of claim 1, claim wherein the change of object pose comprises a change of an orientation of the object pose.

7. The image synthesis system of claim 1,
wherein the scene data comprises data for at least one scene object in the three dimensional scene,
wherein the pose determiner circuit is arranged to determine a new object pose following the change of object pose,
wherein the determination of the new object pose is subject to a constraint that there is no occlusion from the view pose of the three dimensional object by the at least one scene object.

8. The image synthesis system of claim 1,
wherein the scene data comprises object data for at least one object in the three dimensional scene,
wherein the pose determiner circuit is arranged to determine a new object pose following the change of object pose,
wherein the determination of the new object pose is subject to a constraint that there is no overlap between the at least one object in the three dimensional scene and the three dimensional object for the new view pose.

9. The image synthesis system of claim 1,
wherein the viewing zone comprises a reference pose,
wherein the pose determiner circuit is arranged to bias a new object pose towards an alignment of the reference pose with the view pose after the change of the object pose.

10. The image synthesis system of claim 1, wherein the pose determiner circuit is arranged to bias a new object pose following the change of object pose towards a minimum pose difference relative to an object pose prior to the change of object pose.

11. The image synthesis system of claim 1,
wherein the scene data comprises data for at least one scene object in the three dimensional scene,
wherein and the pose determiner circuit is arranged to determine a new object pose following the change of object pose subject to a constraint that there is no occlusion from the view pose of the at least one scene object by the three dimensional object.

12. The image synthesis system of claim 1, wherein the pose determiner circuit is arranged to perform a search over poses for a region of the scene so as to find a new object pose following the change of the object pose for which a plurality of constraints are met.

13. The image synthesis system of claim 1, wherein the representation of the three dimensional object comprises a multi-view image and depth representation of the three dimensional object.

14. The image synthesis system of claim 1,
wherein the scene data provides a visual model of at least a portion of the three dimensional scene,
wherein the view synthesis circuit is arranged to generate the view image in response to the visual model,
wherein the view is image is arranged to be a view of the scene from the view pose blended with the view of the three dimensional object.

15. The image synthesis system of claim 1, wherein the pose determiner circuit is arranged to change the threshold in response to a property of the object data.

16. The image synthesis system of claim 1, wherein the pose determiner circuit is arranged to change the threshold in response to a property of the viewing zone.

17. A method of image synthesis comprising:
receiving scene data, wherein the scene data describes at least a portion of a three dimensional scene;
receiving object data, wherein the object data describes a three dimensional object,
wherein the object data provides visual data for the three dimensional object from a viewing zone,
wherein the view zone has a relative pose with respect to the three dimensional object;
receiving a view pose for a viewer in the three dimensional scene;
determining an object pose for the three dimensional object in the three dimensional scene in response to the scene data and the view pose;
generating a view image from the visual data, the object pose, and the view pose,
wherein the view image comprises a view of the three dimensional object in the three dimensional scene,
wherein the three dimensional object is at the object pose and is viewed from the view pose;
determining a viewing region in the three dimensional scene for the object pose and the relative pose, wherein the viewing region corresponds to the viewing zone is at the object pose;
determining a distance measure for the view pose relative to the viewing region for the object pose; and
changing the object pose in response to the distance measure meeting a first criterion,
wherein the first criterion comprises a requirement that a pose distance between the view pose and a pose of the viewing region exceeds a first threshold,
wherein generating the view image comprises generating the view of the three dimensional object to be from different angles for at least a portion of changes of the view pose for which the pose distance does not exceed the first threshold,
wherein changing the object poses comprises determining a new object pose following the change of the object pose,
wherein the determination of the new object pose is subject to a constraint that the distance measure does not meet the first criterion for the new object pose.

18. A computer program stored on a non-transitory medium, wherein the computer program when executed on a processor performs the method as claimed in claim 17.

19. The method of claim 17, wherein the viewing region is at least a two dimensional region.

20. The method claim 17,
wherein the first threshold is arranged such that the pose distance does not exceed the first threshold for at least a portion of view poses,
wherein the portion of the view poses is in different directions from the object pose.

* * * * *